April 19, 1966    A. KEEL    3,246,760
FLUID FILTERS
Filed Jan. 21, 1963    2 Sheets-Sheet 1

INVENTOR
Adolf Keel

INVENTOR
Adolf Keel

United States Patent Office 3,246,760
Patented Apr. 19, 1966

3,246,760
FLUID FILTERS
Adolf Keel, 164 California Ave., Highland Park, Mich.
Filed Jan. 21, 1963, Ser. No. 252,831
3 Claims. (Cl. 210—132)

The invention relates to the filtering of fluids, and particularly to the removal of solids from the fluid in high pressure hydraulic systems such as are found in machine tools, airplanes, mobile machinery and the like.

The invention applies particularly to such types of hydraulic systems in which at one time or another not all of the hydraulic fluid is passed thru the filter element, systems which are said to have partial filtration.

It is the prime object of this invention to provide an improved method of partial filtration by concentrating heavy undesirable contaminants such as metal chips, scale, and sand in that portion of the fluid stream which is flowing thru the filter, and thus keeping the portion of the fluid which is being by-passed around the filter element substantially free from such impurities.

A further object of this invention is the attainment of this improvement in filtration by simple and straightforward means and the design of such components as will not materially increase the cost of production over now commonly used units.

Most of the fluid filters in use at the present time are equipped with a relief valve which opens and by-passes a portion of the fluid steam around the filter element as soon as the pressure drop across this element reaches a certain magnitude due to the filling up of the filter openings, or because of inadequate filter size for a given flow. The location of such relief valves varies, but frequently they are directly in the path of the incoming fluid stream and present no obstacle whatever to impurities in the fluid which is by-passed around the filter element. In consequence the user of such a filter, in order to obtain satisfactory filtration, must choose a filter element of considerably greater capacity than the maximum flow of the system, in order to insure a useful period of complete filtration before the by-pass relief valve begins to open.

The present invention, by concentrating heavy particles in the partial fluid stream flowing thru the filter, not only permits effective fluid filtration of systems where full filtration is impossible because of weight or cost considerations, but also offers valuable additional safeguards and savings in equipment when applied to full flow filtration systems.

The invention is explained in greater detail in the following description with reference to the drawings in which.

Figure 2:
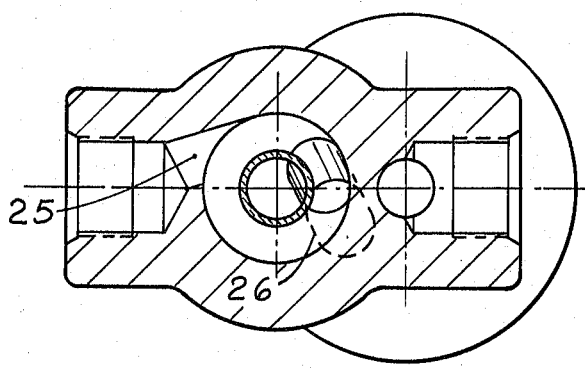
FIG. 2 is a cross-sectional view taken along line 2—2 of FIG. 1.
Figure 1:
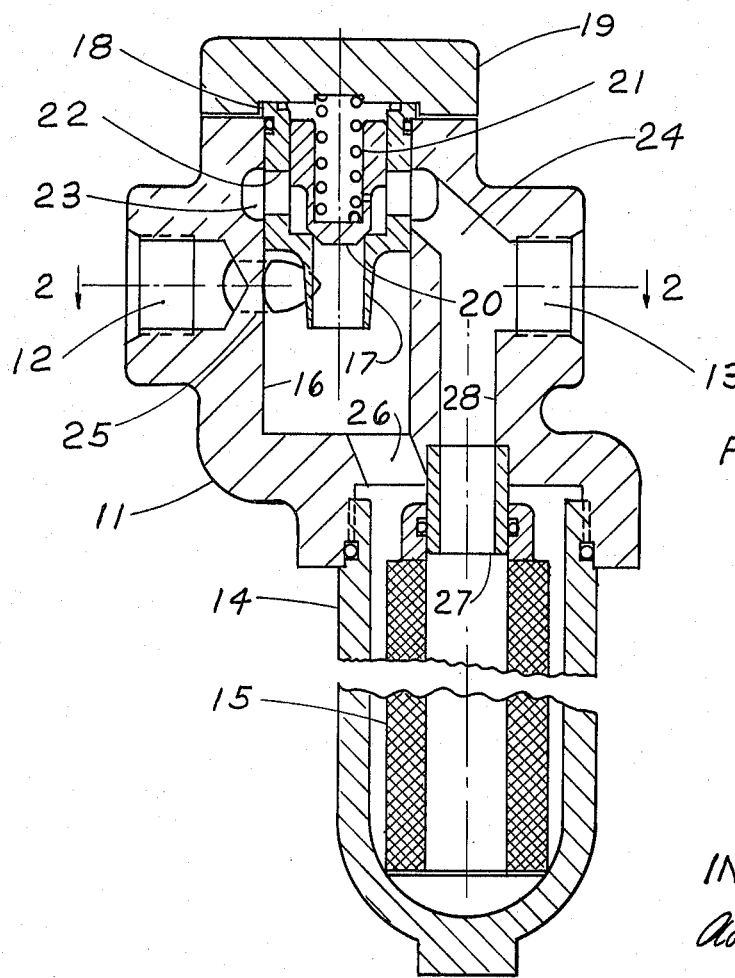
FIG. 1 represents a sectional view of one form of execution of the present invention.
Figure 4:
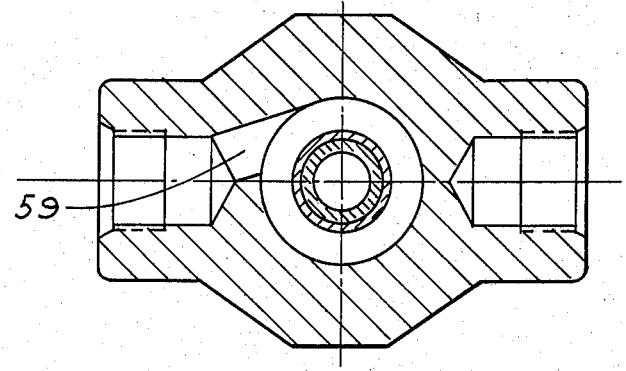
FIG. 4 is a cross-sectional view taken along line 4—4 of FIG. 3.

Referring now to FIG. 1, the filter illustrated in this drawing represents an embodiment of the present invention in which the return flow of fluid from the filter element takes place in a channel separate from the channel occupied by the incoming fluid. The filter assembly shows a head 11, with fluid inlet port 12, fluid outlet port 13, a removable filter bowl 14, and a filter element 15. The head 11 houses a primary chamber 16 which contains a central fluid outlet 17. This fluid outlet has the general shape of a hollow piston, with a tubular section protruding into the primary chamber, and a flange 18 at the upper end to secure its axial location by means of cover 19. Inside of fluid outlet 17 is a relief valve 20, normally held closed by spring 21. Openings 22 communicate with the annular groove 23 and thru passage 24 with the outlet port 13. Passage 25 connects inlet port 12 with primary chamber 16, and passage 26 leads from the primary chamber to the filter bowl and the outside of the filter element. Filter element 15 rests on the bottom of the filter bowl at one end, and fits over a tubular nipple 27 at the other end. This nipple and passage 28 establish the connection between the inside of the filter element and outlet port 13.

Fluid entering inlet port 12 reaches the primary chamber 16 by way of passage 25, and because of the entrance angle of this latter passage is given a rotary motion in the primary chamber. As long as the filter element 15 has sufficient capacity, all of the fluid entering the primary chamber will pass into the filter bowl by way of passage 26, and thence thru the filter element and to the outlet port 13 by way of passage 28. If the pressure drop across filter element 15 reaches a certain predetermined value due to clogging of the element or increased flow of fluid, relief valve 20 will begin to open and let part of the fluid leave chamber 16 and reach the outlet port 13 thru passage 24. The point at which valve 20 begins to open depends upon the tension of spring 21, which can be selected to fit individual requirements. Since the entrance to relief valve 20 is always subjected to the fluid pressure outside of the filter element, and the spring side of the relief valve to that existing inside the filter element, it can be seen that the valve will not open until the pressure difference between the outside and the inside of the filter element reaches the value set by spring 21. With increasing flow, or with decreasing capacity of the filter element, the opening of valve 20 will be such as to maintain this pressure differential. As the filter element keeps filling with impurities, less and less fluid will pass thru the element, and more and more over the relief valve.

It can readily be appreciated that fluid entering the primary chamber 16 thru passage 25 is set into rapid rotary motion, spiralling gradually downward to passage 26 and the filter bowl. The effects of centrifugal force and gravity combine to concentrate heavy particles in the fluid along the perimeter of chamber 16 and to lead them spirally downward into the filter bowl even though substantial portions of the fluid are being by-passed thru the axial outlet 17.

Figure 3:
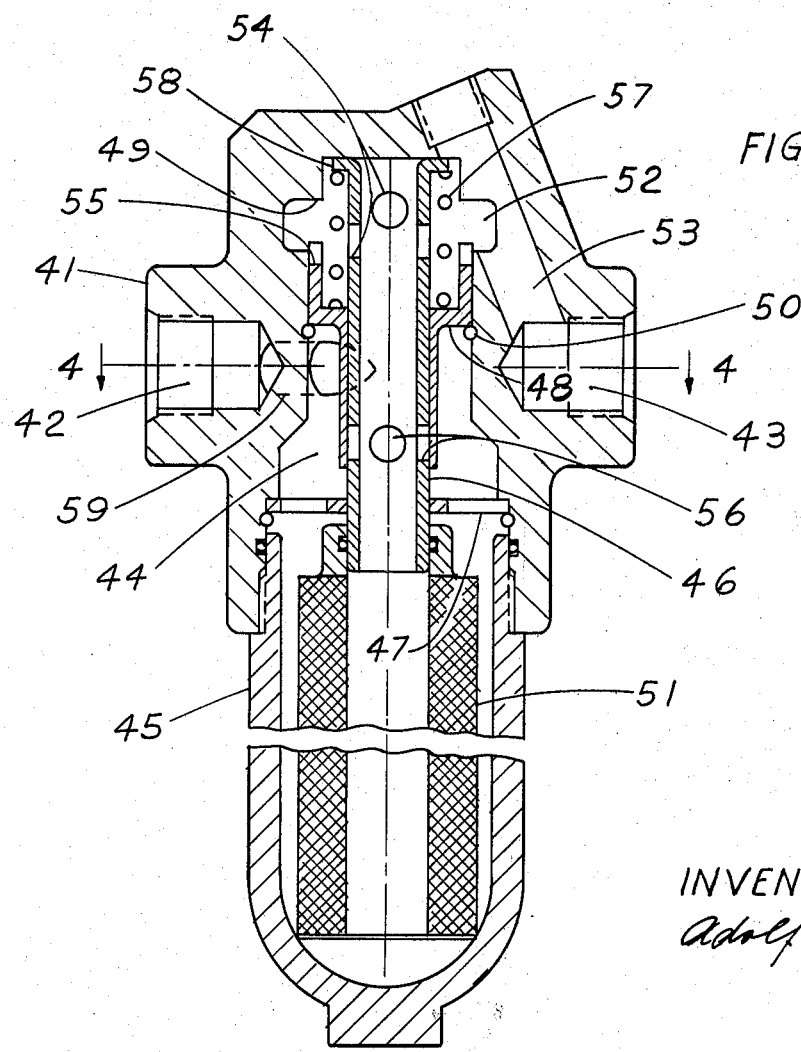
FIG. 3 represents a sectional view illustrating a second form of execution of the present invention.

In FIG. 3 a version of the present invention is illustrated which combines the return flow from the filter element with the by-pass flow over the relief valve in the same central passage, an arrangement which brings filter element and filter bowl in alignment with the central chamber of the head. This design has the advantage of greater compactness and lends itself especially to the manufacture from bar stock. The drawing shows a head 41, with an inlet port 42, an outlet port 43, and a central chamber 44. The entrance to chamber 44 is machined to receive the removable filter bowl 45. The central part of chamber 44 is occupied by a sleeve 46 which at its lower end is radially supported by a spider disc 47, and at its upper end by the piston 48. This piston is slidably fitted to a portion of chamber 44, and slidably fitted also over sleeve 46. The upward movement of piston 48 is limited by the shoulder 49 in chamber 44, and the downward movement by a spring insert 50. Sleeve 46 provides both a mounting for the filter element 51 as well as a fluid passage from the inside of the filter element to the upper portion of chamber 44, and from thereby way of the annulus 52 and passage 53 to the outlet port 43. The holes 54 near the upper end of sleeve 46, and the slots 55 at the upper end of piston 48 serve as passages between the inside of tube 46 and the annulus 52 when the piston is at the upper end of its stroke. Near the lower end of sleeve 46 are several radial holes 56 which serve as a direct connection between the central chamber and outlet port 43 as soon as they are uncovered by the hub of piston 48. A spring 57 between flange 58 of sleeve 46 and piston 48 urges the sleeve against the upper end of the central chamber, and the piston downward against stop 50.

Fluid entering the head at the port 42 reaches the central chamber 44 tangentially thru passage 59. There it is set into rotary motion which causes heavy particles to concentrate along the periphery of chamber 44 as the fluid is spirally flowing downward toward the filter bowl. Such fluid as is lead directly from chamber 44 to the outlet port thru passages 56 is taken from the clean center portion of the revolving fluid body. Piston 48, by governing with its hub-like extension the effective size of passages 56, acts as a relief valve. It keeps these passages closed until the pressure drop across the filter element reaches the value set by spring 57, and permits only such a quantity of fluid to flow direct to the outlet port as will maintain this predetermined pressure drop.

I claim:

1. A fluid filter comprising, in combination, a head, a filter bowl removably attached to said head, a filter element positioned in said bowl, said filter element and said bowl being located almost entirely outside of said head, a substantially cylindrical primary chamber in said head, a communicating passage between said primary chamber and said filter bowl leading to the outside portion of said filter element, a fluid inlet port in the head communicating with a fluid inlet passage to the primary chamber, said inlet passage entering said chamber tangentially so as to impart a rotary motion to the fluid in the said chamber, a centrally located fluid outlet in the primary chamber coaxial with said chamber, the entrance of said fluid outlet being located between said fluid inlet passage and said communicating passage to said filter bowl, fluid pressure responsive means for opening and closing said fluid outlet in the primary chamber in response to pressure drop variations across said filter element, a fluid outlet port from the head, a fluid passage between said coaxial outlet in the primary chamber and the outlet port in the head, and a fluid passage between the inside portion of the filter element and the outlet port on the head.

2. In a fluid filtering device, the combination of a head, a filter bowl removably attached to said head, a filter element located in said filter bowl and located almost entirely below said head, a fluid inlet port and a fluid outlet port in the head, a substantially cylindrical central chamber in said head and coaxial with said filter bowl, fluid pressure responsive slidable means disposed in said central chamber for dividing it into an upper and a lower compartment the lower of the said compartments serving as a primary chamber to the incoming fluid on its way to the filter element in the bowl and being subjected to the fluid pressure existing on the outside of the filter element, the upper of the said compartments serving as a passage for the fluid flowing from the inside of the filter element to the outlet port in the head and being subjected to the fluid pressure existing inside the filter element, means disposed in said chamber for centrally positioning said filter element and simultaneously providing a fluid passage from the said lower compartment to the filter bowl and the outside of said filter element as well as providing a central axial return passage from the inside of said filter element to the upper compartment of said chamber, said fluid pressure responsive slidable means surrounding said axial return passage, a passage of variable size between the said lower compartment and the axial return passage from the inside of the filter element to the upper compartment of said chamber, said passage size being governed by the axial location of said fluid pressure responsive slidable means disposed in the said head, and a passage from the fluid inlet port of the head to the said primary chamber substantially tangent to said chamber so as to impart rotary motion to the fluid therein.

3. In a fluid filtering device, a body having an inlet port and an outlet port, a central cavity in said body disposed on an axis at right angles to the axis of said inlet port, means at the entrance to said cavity for removably attaching a filter container coaxial with said cavity, a filter element disposed in said filter container, a stationary sleeve centrally disposed in said cavity, said sleeve at its inner end being provided with a flange and with the flange abutting against the inner end face of the central cavity, said sleeve also having a series of radial holes near its flanged end and a series of radial holes near its outer end, said sleeve at its outer end also serving to accommodate and locate one end of the said filter element and serving as a fluid passage from the inside portion of said filter element to the inner end of said central cavity, a stationary spider disc located near the entrance of the said cavity and radially supporting the outer end of said stationary sleeve while permitting free axial flow of fluid, a hollow piston slidably fitted to a portion of said central cavity and slidably fitted also over the said stationary sleeve so as to provide radial support to the inner end of said sleeve, said hollow piston having a hub-like extension capable of sealing the radial holes near the outer end of said stationary sleeve, means arranged in the central cavity for limiting the axial movement of said piston, spring means interposed between the flange of said stationary sleeve and said hollow piston to urge said sleeve against a stop at the inner end of said central cavity and to urge said piston oppositely toward the entrance of said cavity, a fluid passage between the inner end of said central cavity and the outlet port of the body, and a fluid passage from the inlet port of said body to the central cavity, said latter fluid passage entering said cavity tangentially so as to impart a rotary motion to the fluid in the cavity and entering said cavity at a pointed occupied by the hub of the said piston.

References Cited by the Examiner

UNITED STATES PATENTS

| | | | |
|---|---|---|---|
| 1,822,006 | 9/1931 | Bull | 210—304 |
| 2,056,756 | 10/1936 | Wiedhofft | 210—133 |
| 2,431,782 | 12/1947 | Walton et al. | 210—133 |
| 2,439,936 | 4/1948 | Kasten | 210—130 |
| 2,533,266 | 12/1950 | Kovacs et al. | 210—130 |
| 2,983,384 | 5/1961 | Winslow | 210—132 |
| 3,070,232 | 12/1962 | Casaleggi | 210—90 |

FOREIGN PATENTS

| | | |
|---|---|---|
| 1,240,689 | 8/1960 | France. |
| 843,237 | 8/1960 | Great Britain. |

REUBEN FRIEDMAN, *Primary Examiner.*

HARRY B. THORNTON, *Examiner.*

F. SPEAR, R. A. CATALPA, *Assistant Examiners.*